(12) United States Patent
Wheeler

(10) Patent No.: US 6,490,686 B1
(45) Date of Patent: Dec. 3, 2002

(54) METHOD AND APPARATUS FOR RESTRICTING PRIVILEGE ACCESS TO DISTRIBUTED CONTENT INFORMATION

(75) Inventor: Peter Wheeler, Mississauga (CA)

(73) Assignee: Ati International Srl, Barbados (KN)

( * ) Notice: Subject to any disclaimer, the term of this patent is extended or adjusted under 35 U.S.C. 154(b) by 0 days.

(21) Appl. No.: 09/166,302

(22) Filed: Oct. 5, 1998

(51) Int. Cl.$^7$ ............................................... H04L 12/56
(52) U.S. Cl. ...................... 713/200; 380/203
(58) Field of Search ........................... 380/3, 4, 5, 203, 380/204, 205; 713/200, 201, 202, 193

(56) References Cited

U.S. PATENT DOCUMENTS

| | | | | |
|---|---|---|---|---|
| 5,825,879 A | * | 10/1998 | Davis ............................. 380/5 |
| 5,933,498 A | * | 8/1999 | Schneck et al. ................ 380/4 |
| 6,070,799 A | * | 6/2000 | Ashe ...................... 235/462.01 |
| 6,118,871 A | * | 9/2000 | Okuyama et al. ........... 380/201 |
| RE37,052 E | * | 2/2001 | Park ............................ 380/203 |
| 6,209,097 B1 | * | 3/2001 | Nakayama et al. .......... 713/193 |
| 6,195,078 B1 | * | 4/2001 | Dinwiddie et al. ......... 345/114 |
| 2001/0005292 A1 | * | 6/2001 | Sugiyama et al. ............ 360/69 |

* cited by examiner

Primary Examiner—Norman M. Wright
(74) Attorney, Agent, or Firm—Vadder, Price, Kaufman & Kammholz

(57) ABSTRACT

A method and apparatus for restricting privileged access to distributed content information, (e.g., audio data stored on a compact disk, audiocassette, etc., and video and/or audio data stored on a DVD disk, video cassette, etc.) begins by extracting a privileged indicator from the distributed content information to produce an extractive privilege indicator. The privileged indicator indicates whether the content data of the distributed content information can be displayed, displayed without copying, displayed with a single copy, displayed with multi-copies, copied once, or copied multiple times. The extracted privilege indicator is transmitted to a distributed content device (e.g., a monitor, a projector, a high definition television, a DVD recorder, a server, and/or a personal computer) via a control channel. Upon receiving the extracted privilege indicator, the distributed content device interprets it to determine the privileged access restrictions. Based on this interpretation, the distributed content device generates a content feedback signal which is provided back to a video graphics processor. Upon receiving the content feedback, the video graphics processor interprets it and produces therefrom a content processing indicator. The video graphic processor then processes the content data based on the content processing indicator. Such processing includes providing the content data to the distributive content device and/or providing a representation of the privileged indicator to the distributive content device.

19 Claims, 3 Drawing Sheets

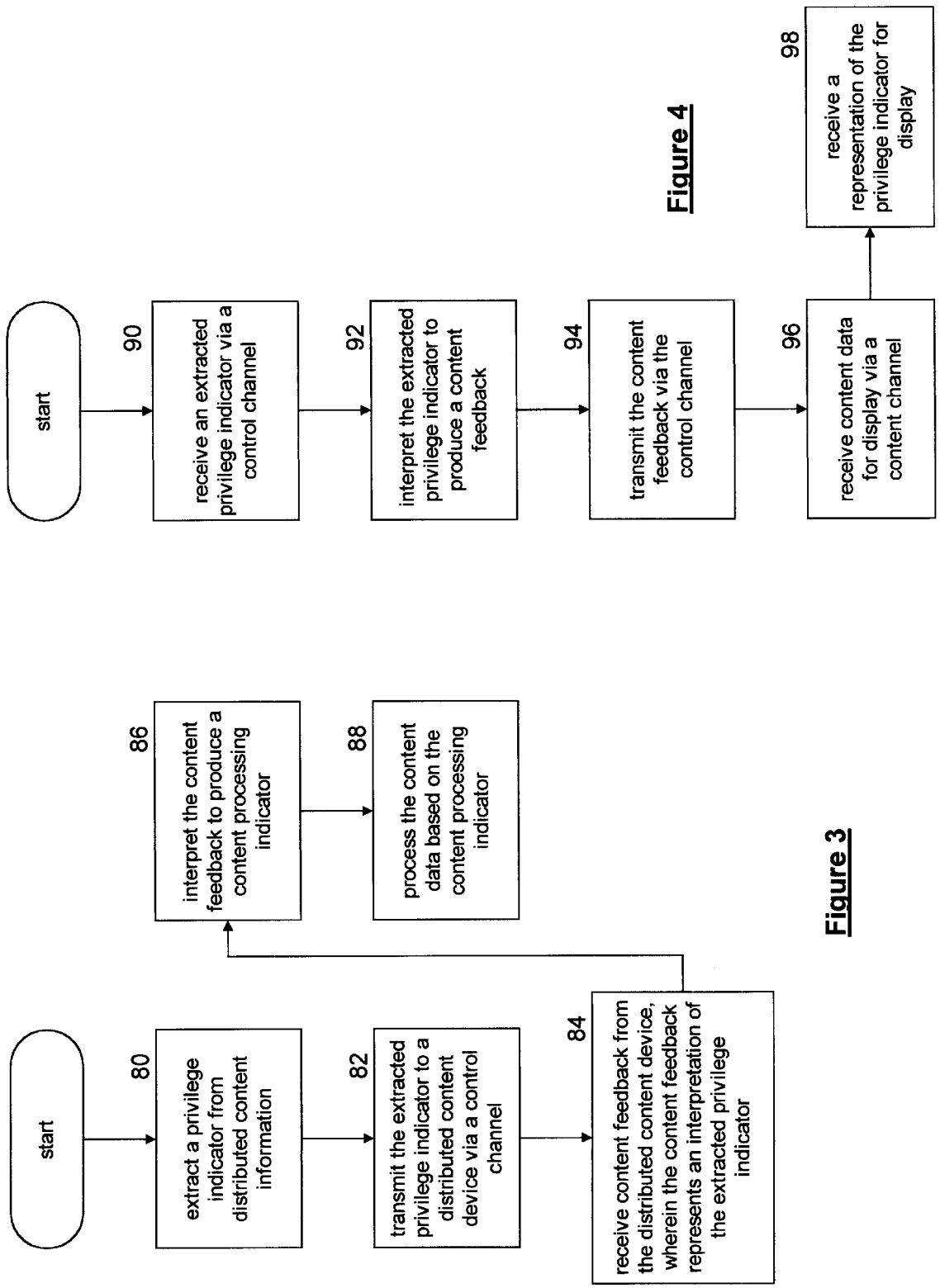

METHOD AND APPARATUS FOR RESTRICTING PRIVILEGE ACCESS TO DISTRIBUTED CONTENT INFORMATION

TECHNICAL FIELD OF THE INVENTION

This invention relates generally to restricting access to content information, such as video data, audio data, etc. and in particular to a method and apparatus for restricting privilege access to distributed content information.

BACKGROUND OF THE INVENTION

Computers are known to include a central processing unit, system memory, audio processing circuitry, video processing circuitry, and peripheral ports such that the central processing units may interface with peripheral devices such as printers, monitors, external tape drives, etc. The video graphics circuit is a co-processor to the central processing unit and performs the co-processing function of preparing data for display on a computer monitor. The video processing circuitry receives graphics data from the central processing unit and converts the graphics data into pixel information for display on the monitor.

The video processing circuit may further process video data that is received via television broadcasts, cable broadcasts, satellite broadcasts, signals from VCRs, and signals from DVD players. To receive such signals, the video processing circuit includes a tuner circuit, an audio decoder and a video decoder. The tuner is operably coupled to receive the broadcast signals and to convert them in to digitized audio signals and digitized video signals. The audio decoder receives the digitized audio signals and converts them into analog signals that are subsequently rendered audible. The video decoder receives the digitized video signals and converts them into video graphics data, which can be displayed on a display (e.g., a computer monitor, TV, etc.). As is known, the video graphics data is in a form that can be stored by the computer's system memory. As such, a computer user may record a television broadcast, cable broadcast, satellite broadcast, VCR transmission, or DVD transmission in the computer's memory for later replay.

Needless to say, content providers (e.g., Hollywood movie makers, television program makers, and distributors) are concerned about unauthorized copying or viewing of their video content. To help reduce the casual copying of such video content, several techniques have been developed. For example, video cassette tapes include an embedded coding that degrades VCR generated copies, but does not affect the display of the original video content on a television. As a further example, digital video discs (DVD), which are digitally recorded, include an embedded copy restriction flag, or a serial copy generation management system (CGMS), in the digital video signals, i.e., the output of a DVD player. The CGMS information indicates, for the entire disk or sectors thereof, whether no copies, one copy, or unlimited copies can be made. As is generally understood, for the copy prevention to work, equipment capable of making copies needs to abide by the copy restriction rules.

While the DVD player, which may be incorporated in a computing system, prevents copying of the video content in accordance with the copy restriction flag, the monitor receives unprotected video graphics data via a standard analog VGA link or digital differential signaling (such as: TMDS [transition minimized differential signaling]; LVDS [low voltage differential signaling] or GVIF [graphics video interface] link. As such, a person intent on obtaining an unauthorized copy of the video content may obtain a VGA or digital differential signaling converter and record or view the video content from the VGA output. One contemplated solution for overcoming copying or viewing from the video graphics controller output is to encrypt the video graphics data provided on the VGA or digital video signaling link. As is also known, the more complex the encryption algorithm, the less likely it is to be broken, but the more it costs. Thus, a computer equipment manufacturer may be left with a difficult choice of including less expensive encryption protection, which can be readily broken by a computer hack, or include more costly encryption protection, which provides the desired security, but may price their equipment out of the market.

A further copy restriction issue arises when a user, who obtained a DVD in an authorized manner (i.e., purchase or lease), is unable to play the DVD. A DVD may not be played if the DVD does not include a copy restriction flag. As is known, some DVD players are designed to check for a copy restriction flag. If copy restriction flag is not found, the disk is presumed to be an illegal copy and is not played. The user, however, is not informed as to why the disk is not playing. This is problematic for a user who believes that he or she obtained a valid disk and does not know why it is not playing. Thus, the user does not know whether his or her equipment is damaged, the disk is damaged, or the copy is an illegal copy and not authorized to be played. A user would further benefit from being informed as to the copying restriction status of valid discs.

Therefore, a need exists for a method and apparatus that prevent unauthorized copying or viewing of distributed content information without expensive encryption techniques and inform users of copy restrictions regarding the distributed content information.

BRIEF DESCRIPTION OF THE DRAWING

FIG. 3 illustrates a logic diagram of a method for restricting privileged access to distributed content information in accordance with the present invention; and FIG. 4 illustrates a logic diagram of a method for a display device to restrict privilege access to distributed content information in accordance with the present invention.

DETAILED DESCRIPTION OF A PREFERRED EMBODIMENT

Generally, the present information provides a method and apparatus for restricting privileged access to distributed content information, (e.g., audio data stored on a compact disk, audio cassette, etc., and video and/or audio data stored on a DVD disk, video cassette, etc.). Such processing begins by extracting a privileged indicator from the distributed content information to produce an extractive privilege indicator. The privileged indicator indicates whether the content data of the distributed content information can be displayed, displayed without copying, displayed with a single copy, displayed with multi-copies, copied once, or copied multiple times. The extracted privilege indicator is transmitted to a distributed content device (e.g., a monitor, a projector, a high definition television, a DVD recorder, a server, and/or a personal computer) via a control channel. Upon receiving the extracted privilege indicator, the distributed content device interprets it to determine the privileged access restrictions. Based on this interpretation, the distributed content device generates a content feedback signal which is provided back to a video graphics processor. Upon receiving the content feedback, the video graphics processor interprets it and produces therefrom a content processing indicator. The video graphic processor then processes the content data based on the content processing indicator. Such processing includes providing the content data to the distributive content device and/or providing a representation of the privileged indicator to the distributive content device. With such a method and apparatus, a user is readily informed of the restrictions on privileged access to the distributive content information. In addition, an efficient and relatively inexpensive method and apparatus are derived for improved copy restriction control.

Figure 1:
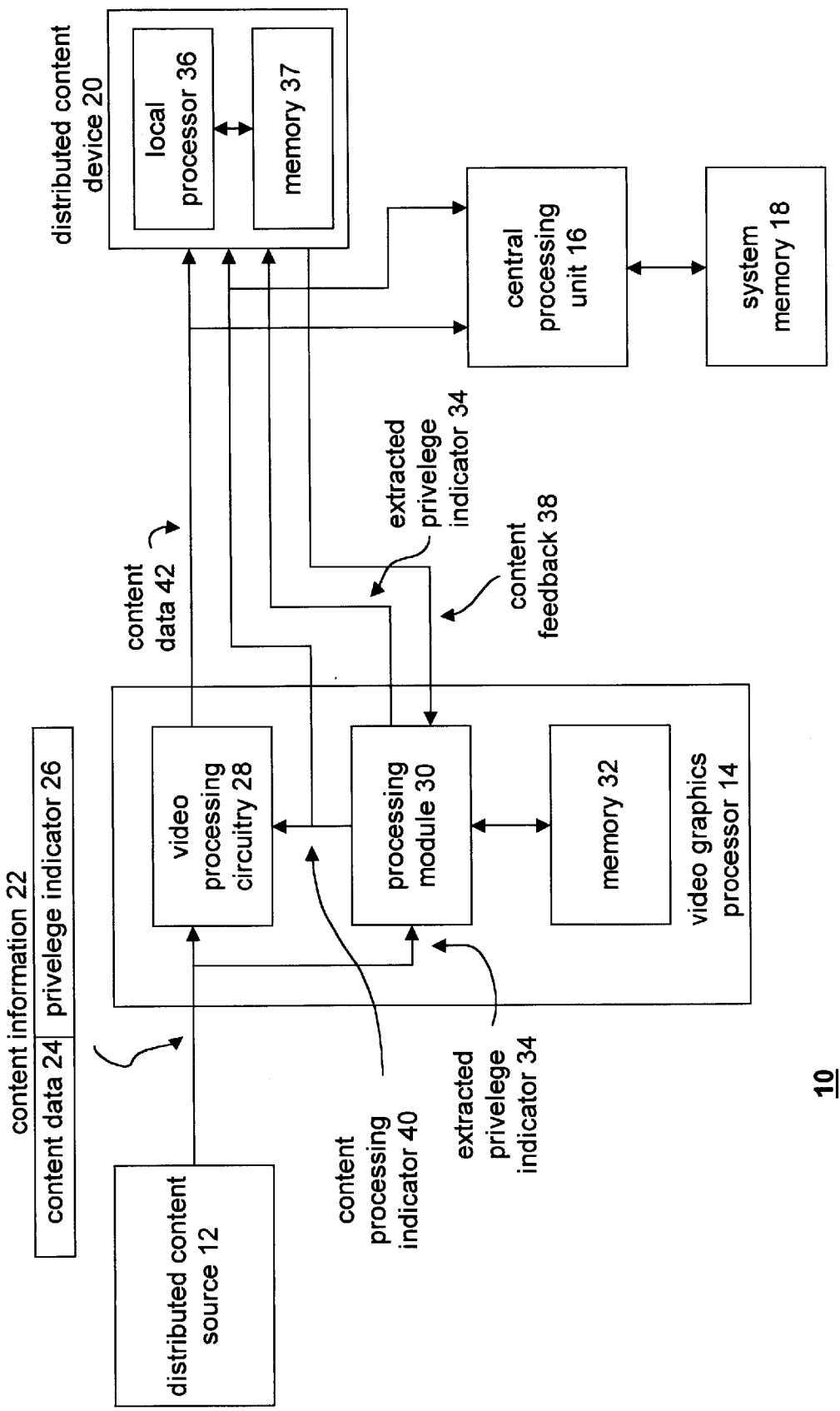
FIG. 1 illustrates a schematic block diagram of a computer system in accordance with the present invention.

The present invention can be more fully described with reference to FIGS. 1 through 4. FIG. 1 illustrates a schematic block diagram of a computer 10 that is operably coupled to a distributive content source 12 and to a distributive content device 20. The computer 10 includes a video graphics processor 14, a central processing unit 16 and system memory 18. The central processing unit 16 and system memory 18 may be equivalent to similar components found in personal computers, workstations, hand held computers, television, video game player, and/or any type of computing device that produces a display. The video graphics processor 14 includes video processing circuitry 28, a processing module 30, and memory 32. The distributed content device 20 includes a local processor 36 and memory 37. The processing module 30 and local processor 36 may each be a single processing entity or a plurality of processing entities. Such a processing entity may be a microcomputer, microprocessor, digital signal processor, microcontroller, central processing unit, state machine, logic circuitry, and/or any device that manipulates digital information based on operating instructions. The memory 32 and memory 37 may each be a single memory device or a plurality of memory devices. Such a memory device may be a read only memory, random access memory, floppy disk memory, hard disk memory, magnetic tape memory, external memory, system memory, and/or any device that stores digital information. As an example, the video graphics processor 14 may be a RAGE PRO, RAGE 128, etc. video graphics processor manufactured and sold by ATI Technologies, Inc., as modified in accordance with the teachings of the present invention.

The distributive content source 12 may be a DVD player, CD player, VCR, television tuner that receives broadcast transmissions, cable transmissions and/or satellite transmissions and/or any device that provides a analog or digital video signal to the computer system 10. In operation, the distributive content source provides content information 22 to the video processing circuitry 28. The content information 22 is stored on a memory storage device, such as a DVD, CD, audio cassette, video cassette, and is distributed by content providers (e.g., Hollywood movie makers, video distribution chains, television program creators, etc.). The content providers include a privileged indicator 26 along with content data 24, which, together, comprise the content information 22. The content data 24 may be video data and/or audio data, while the privileged indicator 26 indicates whether the corresponding content data 24 can be displayed, displayed without copying, displayed and copied once, displayed and copied multiple times, copied once, or copied multiple times. Note that the privilege indicator may be for the entire data content 24 or for portions thereof. For example, the content information 22 may include a plurality of privileged indicators 26, where each of the privileged indicators correspond to a segment, or portion of the content data 24. As such, each portion of the content data 24 may have different copying restrictions.

The processing module 30 executes operational instructions stored in the memory 32 to produce a content processing indicator 40. A detailed discussion of the operational instructions stored in the memory 32 and executed by the processing module 30 will presented below with reference to FIGS. 2 and 3. In general, the processing module 30 monitor the content information 22 for the privilege indicator 26 and, when detected, extracts it. The processing module 30 then sends the extracted privilege indicator 34 to the distributed content device 20 via a control channel. The local processor 36, while executing operational instructions stored in memory 37, interprets the privilege indicator 34 to generate content feedback 38. Such an interpretation determines whether the privilege indicator allows copying, allows displaying, etc. A detailed discussion of the operational instructions stored in memory 37 and executed by the location processor 36 will be presented below with reference to FIGS. 2 and 4.

The local processor 36 provides the content feedback signal 30 to the processing module 30. Upon receiving the content feedback 38, the processing module 30 generates the content processing indicator 40. The video processing circuitry 28, which includes a setup engine, raster engine, and pixel processor, receives the content information 24 from the distributed content source 12 and receives the content processing indicator 40 from the processing module 30. The video processing circuit 28 processes the content data 24 based on the content processing indicator 40. For example, the content processing indicator 40 may indicate that the video processing circuitry 28 may process the content data 24 for display. As such, the video graphics circuitry 28 processes the content data 24 to produce the processed content data 42, which may be video graphics data and/or pixel representations thereof The video processing circuitry 28 then provides processed content data 42 to the buted content device 20 via a content channel, which is a separate channel from the control channel. Alternatively, the content processing indicator 40 may indicated that the video processing circuit is not to process the content data 24, thereby not producing a display. In addition, the content processing indicator 40 may instruct the video processing circuitry 28 to produce a message indicating the copying and/or display status of the content data 24, thereby notifying the user of the copy and/or display status of the content information 22. Note that by having the disturbed content device 20 performing a portion of the copy and/or display status determination, the risk of unauthorized copying by a VGA or digital differential signaling converter is reduced. Thus, if the distributed content device 20 does not respond properly, which would most likely occur with a VGA or digital differential signaling converter, the video graphics circuitry 28 will not produce the processed content data 42.

The processing module 30 also provides the content processing indicator 40 to the central processing unit 16. The CPU 16 processes the content processing indicator 40 to determine whether the processed content data 42 can be copied. If copy enabled, the CPU 16 copies at least a portion of the processed content data 42 in to the system memory 18 or another memory location as designated by the CPU 16. Note that the processed content data 42 may be pixel information that is being provided from a display driver to the distributed content device 20, video graphics data that is being provided to a frame buffer, or video data that is being read from the frame buffer by the display driver. Further note that the content display device 20 may be a monitor, a projector, a high-definition television, a DVD recorder, a server, and/or a personal computer memory device, displays a representation of the privileged indicator, as directed via the content processing indicator 40. Still further note that the content display device 20 may include the display driver and/or the frame buffer. Yet further note that the CPU 16 may perform at least some of the operational instructions stored in the memory 32 and/or memory 37.

Figure 2:
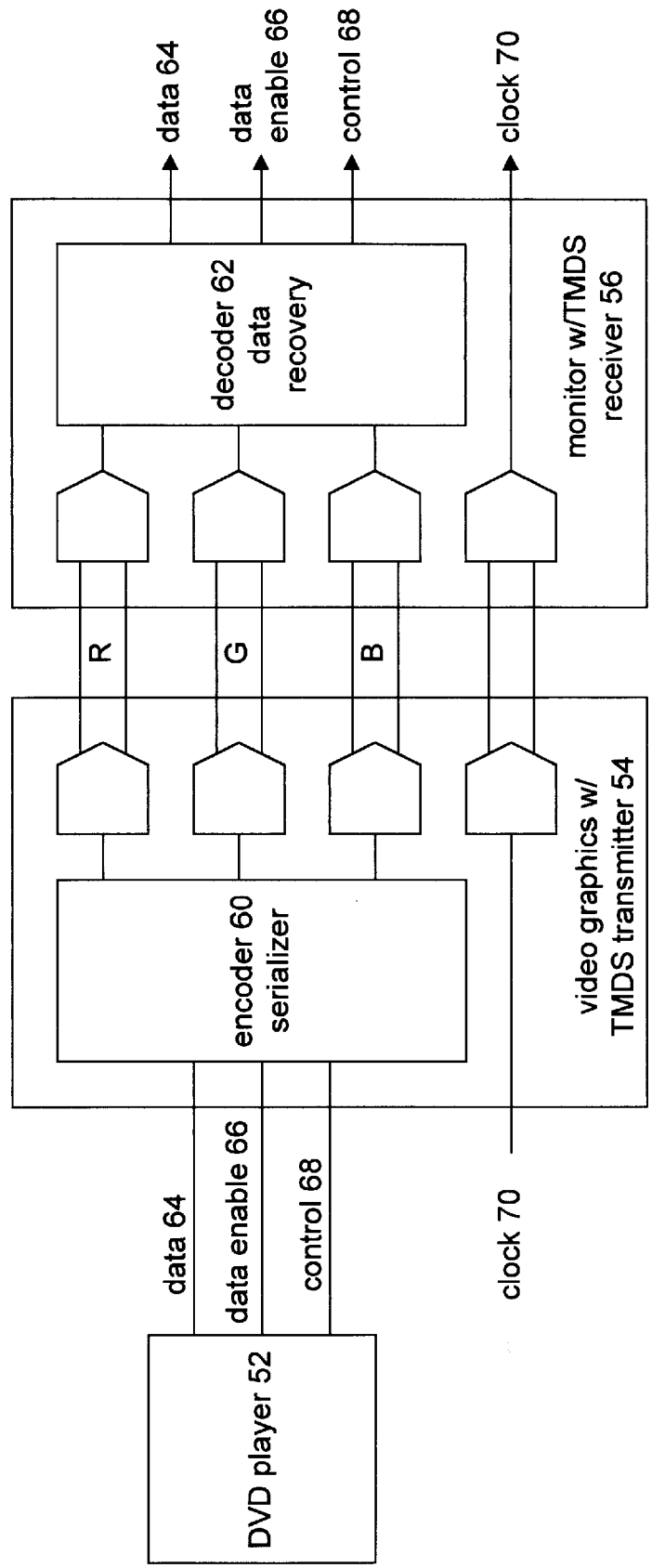
FIG. 2 illustrates a schematic block diagram of a video graphics circuit and monitor in accordance with the present invention.

FIG. 2 illustrates a schematic block diagram of the video graphics processor 14 including a TMDS transmitter and the distributed content device 20 (e.g., a monitor) including a TMDS receiver 56, where TMDS stands for transition minimized differential signaling. The video graphics processor 14 is coupled to receive data 64, a data enabled signal 66, and a control signal 68 from a distributed content source 12, such as a DVD player 52. The video graphics processor 14, via an encoder 60, serializes the inputs into red (R), green (G), and blue (B) digital data streams, with the control information 68 embedded into one or more the digital data streams. Note that the control information 68 includes the privilege indicator 26. The video graphics circuit converts the digital data streams into differential signals, which are provided to the monitor 20. In addition, the video graphics processor receives a clock signal 70 that is provided to the monitor 20 in a similar manner.

The monitor 20 converts the differential data streams into single ended data streams. A decoder 62 receives the single ended data streams and recaptures, therefrom, the data 64, the data enable 66, and the control information 68. By taking advantage of available bandwidth in the control channel, the control information may be readily transported to the monitor 20. The monitor 20 processes the recovered control information 68 in accordance with the teachings of the present invention.

FIG. 3 illustrates a logic diagram of operational instructions that are stored in memory 32 and executed by processing module 30. The process begins at step 80 where a privileged indicator is extracted from distributed content information. The distributed content information may be stored on a DVD disk, CD disk, a laser disk, a videotape, and/or any other digital storage device. The distributed content information further includes content data, which may be audio data and/or video data. The process then proceeds to step 82 where the extracted privilege indicator is transmitted to a distributed content device via a control channel. The privileged indicator indicates whether the content data of the distributed content information may be displayed, not displayed, displayed without copying, displayed with single copying, displayed with multiple copying, copied once, and/or copied multiple times. The data content device may be a monitor, a projector, a high definition television, a DVD recorder, a server, and/or a personal computer memory device.

The process then proceeds to step 84 where the video graphics processor receives content feedback from the distributed content device. The content feedback represents an interpretation performed by the distributed content device on the extracted privilege indicator. As such, the feedback will be representative of the extracted privilege indicator indicating whether the content data can be displayed and/or copied. Note that the extracted privilege indicator and/or the feedback may be encoded to further reduce unauthorized copying and/or displaying of the content data. The process then proceeds to step 86 where the content feedback is interpreted to produce a content processing indicator.

The process then proceeds to step 88 where the content data is processed based on the content processing indicator. Such processing may include transmitting the content data to the distributed content device via a content channel such that the content device may be displayed and/or recorded. Note that the content channel is a separate channel between the video graphics processor and the distributed content device than the control channel. Alternatively, the processing may be enabling copying by the central processing unit and/or a separate recording device. In addition, the processing may be displaying, or causing to be displayed, a representation of the content processing indicator by the distributed content device. As such, if the content processing indicator, which is a representation of the privilege indicator is displayed, the user is informed as to the restrictions on privileged access to the distributive content device. For example, if the user has inadvertently obtained an unauthorized copy of the distributed content information, the processing equipment may not display the content data. As such, the user would be prompted that the distributed content information was copied onto a digital storage medium in an unauthorized manner. As such, the content data will not be displayed. Alternatively, if the content data can be displayed with a single copy allowed, the user knows that only one backup copy can be made.

FIG. 4 illustrates a logic diagram of a method that includes operational instructions that are stored in memory 37 and executed by local processor 36 of the distributed content device 20. The process begins at step 90 where an extracted privileged indicator is received via a control channel. Such a control channel may be as defined via the TMDS signaling between a video graphics circuit and monitor as shown in FIG. 2. The process then proceeds to step 92 where the extracted privilege indicator is interpreted to produce content feedback. Such an interpretation includes reading the extracted privilege indicator to determine whether copying and/or displaying is allowed and in what form. Note that the extracted privilege indicator and/or the content feedback may be encoded to further reduce the risk of unauthorized copying and/or displaying. Further note that if the extracted privilege indicator is encoded, step 92 further includes decoding the extracted privilege indicator.

The process then proceeds to step 94 where the content feedback is transmitted via the control channel to the video graphics processor. The process then proceeds to step 96 where content data is received for display via a content channel. The process then proceeds to step 98 where a representation of the privilege indicator is received for display. Note that steps 96 and 98 may be performed simultaneously or in exclusion of each other. For example, if display is restricted, step 96 would be eliminated.

The preceding discussion has presented a method and apparatus for restricting privilege access to distributed content information. Such a method and apparatus provides an indication to the user as to the restrictions placed upon the distributed content information. In addition, by having an interactive process between the video graphics processor and distributed content device, the ability to ensure that the copy restrictions placed on the distributed content device are followed. As such, the present invention reduces the threat of unauthorized copying or viewing via a VGA or digital differential signaling converter box.

What is claimed is:

1. A method for restricting privileged access to distributed content information, the method comprises the steps of:
   a) extracting a privilege indicator from the distributed content information to produce an extracted privilege indicator;
   b) transmitting the extracted privilege indicator to a distributed content device via a control channel;
   c) receiving content feedback from the distributed content device, wherein the content feedback represents an interpretation of the extracted privilege indicator;
   d) interpreting the content feedback to produce a content processing indicator; and
   e) processing content data of the distributed content information based on the content processing indicator.

2. The method of claim 1 further comprises at least one of:
   transmitting the content data to the distributed content device via a content channel when the content processing indicator indicates transmission, wherein the control channel is separate from the content channel;
   transmitting the content data to the distributed content device via a content channel when the content processing indicator indicates transmission, wherein the control signal data is multiplexed with the content signal data on the same channel.

3. The method of claim 1 further comprises enabling copy privilege when the content processing indicator that the content data can be copied.

4. The method of claim 1 further comprises displaying a representation of the content processing indicator by the distributed content device.

5. The method of claim 1, wherein the content processing indicator indicates at least one of: no display, display without copying, display with single copy, display with multiple copy, single copy, and multiple copy.

6. The method of claim 1, wherein the distributed content device comprises at least one of: a monitor, a projector, a high definition television, a DVD player, a server, and a personal computer memory device.

7. The method of claim 1, wherein the distributed content information is stored on at least one of: a DVD disk, a CD disk, laser disc, video tape, and a digital storage medium.

8. A video graphics processor comprises:
   video processing circuitry to render pixel information from distributed content information;
   a processing module; and
   memory operably coupled to the processing module, wherein the memory stores operating instructions that cause the processing module to (a) extract a privilege indicator from the distributed content information to produce an extracted privilege indicator; (b) transmit the extracted privilege indicator to a distributed content device via a control channel; (c) receive content feedback from the distributed content device, wherein the content feedback represents an interpretation of the extracted privilege indicator; (d) interpret the content feedback to produce a content processing indicator; and (e) control processing of content data of the distributed content information based on the content processing indicator.

9. The video graphics processor of claim 8, wherein the memory further comprises operating instructions that cause the processing module to transmit the content data to the distributed content device via a content channel when the content processing indicator indicates transmission, wherein the control channel is separate from the content channel.

10. The video graphics processor of claim 8, wherein the memory further comprises operating instructions that cause the processing module to enable copy privilege when the content processing indicator indicates that the content data can be copied.

11. The video graphics processor of claim 8, wherein the memory further comprises operating instructions that cause the processing module to provide a representation of the content processing indicator to be displayed by the distributed content device.

12. A video display device comprises:
   a distributed content device; and
   a video graphics processor, wherein the video graphics processor includes:
      video processing circuitry to render pixel information from distributed content information;
      a processing module; and
      memory operably coupled to the processing module, wherein the memory stores operating instructions that cause the processing module to (a) extract a privilege indicator from the distributed content information to produce an extracted privilege indicator; (b) transmit the extracted privilege indicator to a distributed content device via a control channel; (c) receive content feedback from the distributed content device, wherein the content feedback represents an interpretation of the extracted privilege indicator; (d) interpret the content feedback to produce a content processing indicator; and (e) control processing of content data of the distributed content information based on the content processing indicator.

13. The video display device of claim 12, wherein the memory further comprises operating instructions that cause the processing module to transmit the content data to the distributed content device via a content channel when the content processing indicator indicates transmission, wherein the control channel is separate from the content channel.

14. The video display device of claim 12, wherein the memory further comprises operating instructions that cause the processing module to enable copy privilege when the content processing indicator indicates that the content data can be copied.

15. The video display device of claim 12, wherein the memory further comprises operating instructions that cause the processing module to provide a representation of the content processing indicator to be displayed by the distributed content device.

16. A method for processing a privileged indicator, the method comprises the steps of:
   a) receiving an extracted privilege indicator from a video graphics processor, wherein the video graphics processor extracted a privilege indicator from distributed content information;
   b) interpreting the extracted privilege indicator to determine access privilege restrictions;
   c) producing content feedback based on the interpreting of the extracted privilege indicator;
   d) receiving at least one of: content data via a content channel and a representation of the privilege indicator via a control channel; and
   e) displaying the at least one of the content data and the representation of the privilege indicator.

17. The method of claim 16 further comprises transmitting the content feedback to the video graphics processor via the control channel.

18. A distributed content device comprises:

a processor; and memory operably coupled to the processor, wherein the memory includes operational instructions that cause the processor to (a) receive an extracted privilege indicator from a video graphics processor, wherein the video graphics processor extracted a privilege indicator from distributed content information; (b) interpret the extracted privilege indicator to determine access privilege restrictions; (c) produce content feedback based on the interpreting of the extracted privilege indicator; (d) receive at least one of: content data via a content channel and a representation of the privilege indicator via a control channel; and (e) display the at least one of the content data and the representation of the privilege indicator.

19. The distributed content device of claim 18, wherein the memory further comprises operational instructions that cause the processor to transmit the content feedback to the video graphics processor via the control channel.

* * * * *